(12) United States Patent
Cho et al.

(10) Patent No.: US 12,194,491 B2
(45) Date of Patent: Jan. 14, 2025

(54) TERNARY HOT-DIP GALVANNEALED STEEL SHEET SURFACE TREATMENT SOLUTION COMPOSITION FOR PROVIDING EXCELLENT BLACKENING RESISTANCE AND ALKALI RESISTANCE, TERNARY HOT-DIP GALVANNEALED STEEL SHEET SURFACE-TREATED USING SAME, AND MANUFACTURING METHOD THEREFOR

(71) Applicant: POSCO, Pohang-si (KR)

(72) Inventors: Soo-Hyoun Cho, Pohang-si (KR); Won-Ho Son, Pohang-si (KR)

(73) Assignee: POSCO, Pohang-si (KR)

( * ) Notice: Subject to any disclaimer, the term of this patent is extended or adjusted under 35 U.S.C. 154(b) by 491 days.

(21) Appl. No.: 17/762,964

(22) PCT Filed: Sep. 23, 2020

(86) PCT No.: PCT/KR2020/012844
§ 371 (c)(1),
(2) Date: Mar. 23, 2022

(87) PCT Pub. No.: WO2021/060818
PCT Pub. Date: Apr. 1, 2021

(65) Prior Publication Data
US 2022/0371049 A1 Nov. 24, 2022

(30) Foreign Application Priority Data

Sep. 24, 2019 (KR) .................. 10-2019-0117527

(51) Int. Cl.
| B05D 1/18 | (2006.01) |
| C09D 5/10 | (2006.01) |
| C09D 175/04 | (2006.01) |
| C09D 183/04 | (2006.01) |
| C23C 2/26 | (2006.01) |

(52) U.S. Cl.
CPC .............. *B05D 1/18* (2013.01); *C09D 5/103* (2013.01); *C09D 175/04* (2013.01); *C09D 183/04* (2013.01); *C23C 2/26* (2013.01); *B05D 2202/15* (2013.01); *B05D 2503/00* (2013.01)

(58) Field of Classification Search
CPC .............. B05D 2518/10; B05D 3/0281; B05D 3/0413; B05D 7/14; C08G 77/26; C08G 2150/90; C08G 18/42; C08G 18/44; C08K 2003/282; C08K 2003/3009; C23C 2222/20; C23C 22/40; C23C 2/06; C23C 2/40; C23C 28/321; C23C 28/34; C09D 5/08; C09D 7/61; C09D 7/63; C09D 7/65; C09D 183/08; C09D 175/06; C09D 7/40; C22C 18/00; C22C 18/04; C08L 83/06

See application file for complete search history.

(56) References Cited

U.S. PATENT DOCUMENTS

| 5,342,882 A | 8/1994 | Gobel et al. |
| 2010/0272991 A1 | 10/2010 | Park et al. |
| 2012/0204762 A1 | 8/2012 | Albert et al. |
| 2013/0084453 A1 | 4/2013 | Imokawa et al. |
| 2013/0171468 A1 | 7/2013 | Imokawa et al. |
| 2019/0264333 A1 | 8/2019 | Cho et al. |
| 2019/0264334 A1 | 8/2019 | Cho et al. |
| 2023/0348732 A1* | 11/2023 | Cho ................. C23C 28/3225 |

FOREIGN PATENT DOCUMENTS

| CN | 101960047 A | 1/2011 |
| CN | 102884225 A | 1/2013 |
| CN | 103119200 A | 5/2013 |
| CN | 103911063 A | 7/2014 |
| CN | 109804102 A | 5/2019 |
| EP | 1 959 030 A2 | 8/2008 |
| EP | 3 524 711 A1 | 8/2019 |
| EP | 3730672 A1 | 10/2020 |
| JP | S51-071233 A | 6/1976 |

(Continued)

OTHER PUBLICATIONS

Japanese Office Action dated Mar. 14, 2023, issued in corresponding Japanese Patent Application No. 2022-518825.
International Search Report dated Jan. 12, 2021 issued in International Patent Application No. PCT/KR2020/012844 (with English translation).
Chinese Office Action dated Aug. 2, 2022 issued in Chinese Patent Application No. 202080065185.8 (with English translation).
Hu Zhong, et al., "Preparation and Properties of Chromium-Free Passivating Coatings Based on Cationic Waterborne PU," Apr. 30, 2017 (partial English translation).

*Primary Examiner* — Anthony J Green
(74) *Attorney, Agent, or Firm* — Morgan, Lewis & Bockius LLP

(57) ABSTRACT

The present invention relates to a surface treatment composition comprising, on the basis of 100 wt % of the solid part of the composition, 20-40 wt % of a water-soluble polyurethane resin, 40-60 wt % of a silane-based sol-gel resin in which three types of silane compounds are cross-linked, 5-15 wt % of a curing agent, 0.5-1.5 wt % of a corrosion inhibitor, 0.1-1.0 wt % of a molybdenum-based compound, 1.0-3.0 wt % of a silane coupling agent; 1.0-2.0 wt % of an organometallic complex, 1.0-2.0 wt % of an acid scavenger, 0.1-1.0 wt % of an aluminum-based compound, and 1.0-2.0 wt % of a lubricant. A ternary hot-dip galvannealed steel sheet treated with a chromium-free surface treatment coating agent, according to an exemplary embodiment in the present invention, has excellent resistance to blackening, alkali and corrosion, and provides excellent effects without concern for problems, in chromium treatment, of additional equipment installation, an increase in manufacturing costs and environmental pollution.

20 Claims, No Drawings

(56) References Cited

FOREIGN PATENT DOCUMENTS

| | | |
|---|---|---|
| JP | S53-028857 B | 8/1978 |
| JP | H07-96699 B2 | 10/1995 |
| JP | 2000-248379 A | 9/2000 |
| JP | 2002-332574 A | 11/2002 |
| JP | 2004-263252 A | 9/2004 |
| JP | 2005-146340 A | 6/2005 |
| JP | 2006-192717 A | 7/2006 |
| JP | 2007-051323 A | 3/2007 |
| JP | 2009-249690 A | 10/2009 |
| JP | 2017-087501 A | 5/2017 |
| JP | 2019-518141 A | 6/2019 |
| KR | 10-2009-0071490 A | 7/2009 |
| KR | 10-1586840 B1 | 1/2016 |
| KR | 10-2018-0124770 A | 11/2018 |
| KR | 10-2019-0076099 A | 7/2019 |
| WO | 2016/063521 A1 | 4/2016 |
| WO | 2019/124990 A1 | 6/2019 |

\* cited by examiner

TERNARY HOT-DIP GALVANNEALED STEEL SHEET SURFACE TREATMENT SOLUTION COMPOSITION FOR PROVIDING EXCELLENT BLACKENING RESISTANCE AND ALKALI RESISTANCE, TERNARY HOT-DIP GALVANNEALED STEEL SHEET SURFACE-TREATED USING SAME, AND MANUFACTURING METHOD THEREFOR

CROSS-REFERENCE OF RELATED APPLICATIONS

This application is the U.S. National Phase under 35 U.S.C. § 371 of International Patent Application No. PCT/KR2020/012844, filed on Sep. 23, 2020, which in turn claims the benefit of Korean Application No. 10-2019-0117527, filed on Sep. 24, 2019, the entire disclosures of which applications are incorporated by reference herein.

TECHNICAL FIELD

The present disclosure relates to a surface treatment solution composition applied to a surface of a metal material and application thereof, and more particularly, to a chrome-free surface treatment solution composition used for home appliances and which improves blackening resistance, alkali resistance, and corrosion resistance of a steel sheet with ternary hot-dip galvannealed layer containing magnesium (Mg) and aluminum (Al), a ternary hot-dip galvannealed steel sheet surface-treated using the solution composition, and a manufacturing method therefor.

BACKGROUND ART

In general, a steel sheet with a hot-dip galvannealed layer containing magnesium (Mg) and aluminum (Al) is a steel sheet having better corrosion resistance against red rust than a pure galvanized steel sheet.

Most of an exposed surface of the steel sheet with the hot-dip galvannealed layer containing magnesium (Mg) and aluminum (Al) is formed of zinc (Zn) or zinc alloy (Zn alloy), and therefore, when the steel sheet is exposed to a general environment, especially a humid atmosphere, a white rust phenomenon may occur on the surface of the steel sheet. In addition, since the magnesium and aluminum contained in the plating layer have better oxygen affinity than zinc, when oxygen binding to zinc is insufficient, blackening tends to occur.

Conventionally, as a part of an anti-rust treatment, 5 to 100 mg/m$^2$ of chromate pretreatment film was formed on a surface of metal, and then, an organic film was formed on the surface of the metal. However, due to heavy metals such as chromium contained in the pretreatment agent, additional pretreatment facilities and processes were required, and the safety of workers became a problem due to heavy metal wastewater. In addition, hexavalent chromium-containing solutions generated in washing water and wastewater need to be treated according to a special treatment process, resulting in an increase in manufacturing costs, and the chromate-treated plated steel sheet also had a problem of eluting chromium ions during use or disposal, resulting in serious environmental pollution.

In order to secure corrosion resistance while solving this problem, a surface treatment agent such as a corrosion-resistant metal coating agent that does not contain chromium has been developed in the related art.

For example, in Japanese Patent Laid-Open Publication No. Sho 53-28857 and Japanese Patent Laid-Open Publication No. Sho 51-71233, a coating material contained aluminum phosphate or was formed by combining tannic acid with aromatic carboxylic acids, such as sodium acetate, sodium borate, and imidazole, and surfactants, but had poor corrosion resistance. Meanwhile, Japanese Patent Laid-Open No. 2002-332574 discloses a surface treatment agent composed of zirconium carbonate, vanadyl ion, a zirconium compound, etc., while the surface treatment agent has good corrosion resistance but is vulnerable to blackening resistance.

In addition, Japanese Patent No. Hei 7-096699 discloses a surface treatment agent composed of titanium-based, zirconium-based, phosphoric acid-based, molybdenum-based compounds, etc., but blackening of a hot-dip galvannealed steel sheet containing magnesium (Mg), aluminum (Al), etc., is not suppressed. In addition, Japanese Patent Laid-Open Publication No. 2005-146340 discloses a surface treatment agent composed of ammonium molybdate, a water-dispersed urethane resin, isopropylamine, zirconium ammonium carbonate, an epoxy-based silane coupling agent, and silica sol. In this case, however, the surface treatment agent may be difficult to apply where conductivity and weldability are required because a thickness of a surface-treated coating film increases, and may not provide sufficient corrosion resistance when the thickness is reduced.

RELATED ART DOCUMENT

Patent Document

Japanese Patent Laid-Open Publication No. Sho 53-28857
Japanese Patent Laid-Open Publication No. Sho 51-71233
Japanese Patent Laid-Open Publication No. 2002-332574
Japanese Patent No. Hei 7-096699
Japanese Patent Laid-Open Publication No. 2005-146340

DISCLOSURE

Technical Problem

An aspect of the present disclosure is to provide a surface treatment composition for a hot-dip galvannealed steel sheet providing excellent properties of blackening resistance, alkali resistance, and corrosion resistance, a surface treatment method using the same, and a surface-treated hot-dip galvannealed steel sheet.

Another aspect of the present disclosure is to provide a surface treatment composition for a plated steel sheet, harmless to the human body, and which does not cause problems due to environmental pollution because the surface treatment composition does not contain any heavy metal components such as chromium which is an environmental pollutant.

Technical Solution

According to an aspect of the present disclosure, a surface treatment composition may include: based on 100 wt % of solid content of composition, 20 to 40 wt % of water-soluble polyurethane resin; 40 to 60 wt % of silane-based sol-gel resin in which three types of silane compounds are cross-linked; 5 to 15 wt % of curing agent; 0.5 to 1.5 wt % of an anti-rust corrosion resistance agent; 0.1 to 1.0 wt % of a molybdenum-based compound; 1.0 to 3.0 wt % of a silane coupling agent; 1.0 to 2.0 wt % of an organometallic complex; 1.0 to 2.0 wt % of an acid scavenger; 0.1 to 1.0 wt % of an aluminum-based compound; and 1.0 to 2.0 wt % of a lubricant.

The water-soluble polyurethane-based resin may be a reaction product of polyester polyol or polycarbonate polyol and a polyisocyanate compound.

The polyester polyol or the polycarbonate polyol may have a hydroxyl value of 80 to 200 mgKOH/g, and a weight average molecular weight of 1,000 to 5,000.

The silane-based sol-gel resin in which the three types of silane compounds are cross-linked may be obtained from a polymer of a first silane which is one type selected from the group consisting of tetraethylortho silicate, tetramethoxy silane, methyltrimethoxy silane, methyltriethoxy silane, dimethyldimethoxy silane, and dimethyldiethoxy silane; a second silane which is one type selected from the group consisting of 3-glycyloxypropyl-trimethoxy silane, 2-(3,4 epoxycyclohexyl-ethyltrimethoxy silane, 3-glycyloxypropyltrimethoxy silane, 3-glycyloxypropylmethyldiethoxy silane; and a third silane which is one type selected from the group consisting of 3-aminopropyl-triethoxysilane, N-(2-aminoethyl)3-aminopropylmethyldimethoxy silane, N-(2-aminoethyl)3-aminopropyl trimethoxy silane, and N-(2-aminoethyl)3-aminopropyltriethoxy silane.

The curing agent may be at least one selected from the group consisting of a melamine-based curing agent, a carbodiimide-based curing agent, a blockisocyanate-based curing agent, an aziridine-based curing agent, and an oxazoline-based curing agent.

The anti-rust corrosion resistance agent may be at least one selected from the group consisting of a phosphoric acid-based compound, a fluorine-based compound, a vanadium-based compound, a cerium salt-based compound, and a selenium salt-based compound.

The molybdenum-based compound may be at least one selected from the group consisting of molybdenum oxide, molybdenum sulfide, molybdenum acetate, molybdenum phosphate, molybdenum carbide, molybdenum chloride, and molybdenum nitride.

The silane coupling agent may be at least one selected from the group consisting of vinyl triethoxy silane, 3-glycyloxyproc trimethoxysilane, 3-glycyloxypropyl triethoxysilane, 3-glycyloxypropylmethyl dimethoxy silane, N-2-(amino ethyl)-3-aminopropyl triethoxy silane, 3-aminopropyl trimethoxy silane, 3-aminopropyl triethoxy silane, and 2-perfluoro octyl ethyl trimethoxy silane.

The organometallic complex may be at least one selected from the group consisting of a silane-based compound, a titanium-based compound, and a zirconium-based compound.

The acid scavenger may be at least one selected from the group consisting of a carboimide-based compound and an oxazoline-based compound.

The aluminum-based compound may be at least one selected from the group consisting of aluminum oxide, aluminum hydroxide, aluminum chloride, aluminum sulfate, aluminum nitrate, aluminum carbonate, aluminum acetate, aluminum silicate, aluminum phosphate, aluminum fluoride, and aluminum nitride.

The lubricant may be at least one selected from the group consisting of paraffin-based wax, olefin-based wax, carnauba-based wax, polyester-based wax, polyethylene-based wax, polypropylene-based wax, polyethylene-Teflon-based wax, and polyteflon-based wax.

The surface treatment composition may further contain a solvent, a solid content may be 10 to 20 wt %, and the balance may be a solvent.

The solvent may contain 3 to 5 wt % of alcohol and a remainder of water, based on a total weight of solvent.

According to another aspect of the present disclosure, a method of manufacturing a surface-treated ternary hot-dip galvannealed steel sheet may include: coating any one of the surface treatment compositions on a ternary hot-dip galvannealed steel sheet on which a ternary hot-dip galvannealed layer is formed; and drying the coated surface treatment composition to form a surface-treated film layer.

The surface treatment solution composition may be coated to a thickness of 1.5 to 30 μm.

The coating may be made by roll coating, spraying, immersion, spray squeezing, or immersion squeezing.

The drying may be performed at a temperature of to 150° C. based on a material steel sheet peak metal temperature (PMT).

The drying may be performed in a hot air drying furnace or an induction heating furnace.

The hot air drying furnace may have an internal temperature of 100 to 250° C.

The induction heating furnace may have a current of 1000 to 4500 A applied thereto.

The method may further include: water-cooling the surface-treated film layer.

The method of manufacturing a ternary hot-dip galvannealed steel sheet may be performed in a continuous process, and a speed of the continuous process may be 80 to 120 mpm.

According to another aspect of the present disclosure, a surface-treated ternary hot-dip galvannealed steel sheet may include: a steel sheet; a ternary hot-dip galvannealed layer formed on at least one surface of the steel sheet; and a surface-treated film layer formed on the ternary hot-dip galvannealed layer, in which the surface-treated film layer may be formed of any one of the above-described surface treatment compositions.

The ternary hot-dip galvannealed layer may include an Al-enriched layer formed at an interface, and an area ratio occupied by the Al-enriched layer may be 70% or more (including 100%).

The ternary hot-dip galvannealed layer may contain 0.2 to 15 wt % of Al, 0.5 to 3.5 wt % of Mg, the balance Zn, and unavoidable impurities.

The surface-treated film layer may have a thickness of 0.3 to 3 μm.

Advantageous Effects

According to an exemplary embodiment in the present disclosure, a ternary hot-dip galvanized steel sheet treated with a chromium-free surface treatment coating agent, in particular, has excellent blackening resistance, alkali resistance and corrosion resistance and provides excellent effects without concern for problems, in chromium treatment, of additional equipment installation, an increase in manufacturing costs and environmental pollution.

BEST MODE

Hereinafter, exemplary embodiments in the present disclosure will be described with reference to the accompanying drawings. However, exemplary embodiments in the present disclosure may be modified in several other forms, and the scope of the present disclosure is not limited to exemplary embodiments to be described below.

The present disclosure relates to a surface treatment solution composition applied to a surface of a metal material and application thereof, and relates to a chrome-free surface treatment solution composition containing a water-soluble organic resin and an inorganic compound, a ternary hot-dip galvannealed steel sheet surface-treated with the composition, and a method of manufacturing the ternary hot-dip galvannealed steel sheet.

According to an aspect of the present disclosure, a surface treatment composition may include, based on 100 wt % of solid content of composition, 20 to 40 wt % of water-soluble polyurethane resin, 40 to 60 wt % of silane-based sol-gel resin in which three types of silane compounds are cross-linked, 5 to 15 wt % of curing agent, 0.5 to 1.5 wt % of an anti-rust corrosion resistance agent, 0.1 to 1.0 wt % of a molybdenum-based compound, 1.0 to 3.0 wt % of a silane coupling agent; 1.0 to 2.0 wt % of an organometallic complex, 1.0 to 2.0 wt % of an acid scavenger, 0.1 to 1.0 wt % of an aluminum-based compound, and 1.0 to 2.0 wt % of a lubricant, and a balance of solvent.

According to an exemplary embodiment in the present disclosure, a ternary hot-dip galvannealed steel sheet surface-treated with chrome-free surface treatment solution composition containing a water-soluble organic resin and an inorganic compound has excellent blackening resistance, alkali resistance, and corrosion resistance. In addition, the surface treatment solution composition does not contain hexavalent chromium which is a harmful environmental substance, and contains the water-soluble organic resin and the inorganic compound, which are harmless to the human body, as main components, to thereby prevent damage to the human body and problems of environmental pollution.

The water-soluble polyurethane-based resin is a main resin of the surface treatment solution composition for the hot-dip galvannealed steel sheet, and is included to impart the excellent corrosion resistance and alkali resistance to the surface-treated ternary hot-dip galvannealed steel sheet.

The water-soluble polyurethane resin is a reaction product by a reaction of a polyol compound and a polyisocyanate compound, and as the polyol, polyester polyol or polycarbonate polyol may be preferably used.

The polyester polyol or polycarbonate polyol preferably has a hydroxyl value of 80 to 200 mgKOH/g. When the hydroxyl value of the polyester polyol or polycarbonate polyol is less than 80 mgKOH/g, water dispersion stability may deteriorate, and functional group sites for reaction with inorganic compounds may be insufficient, and thus, it may be difficult to secure the required physical properties. On the other hand, when the hydroxyl value exceeds 200 mgKOH/g, the water dispersion stability is excellent, but problems may occur in which water resistance, corrosion resistance, and alkali degreasability may deteriorate after film rolling. The hydroxyl value of the polyester polyol or polycarbonate polyol may be, for example, 80 to 180, 80 to 150, 100 to 200, and 100 to 150, and more preferably, 100 to 150.

The polyester polyol or polycarbonate polyol preferably has a weight average molecular weight of 1,000 to 5,000. When the weight average molecular weight is less than 1,000, it may be difficult to secure the sufficient corrosion resistance, and when the weight average molecular weight exceeds 5,000, the solution stability may deteriorate. The weight average molecular weight may be, for example, 1,000 to 4,500, 1000 to 4000, 1000 to 3500, 1500 to 5000, 1500 to 4500, 1500 to 4000, 2000 to 5000, 2000 to 4500, 2000 to 4000, and more preferably, 2000 to 4000.

The water-soluble polyurethane resin may be preferably 20 to 40 wt % based on 100 wt % of the solid content of the surface treatment composition. When the water-soluble polyurethane resin is less than 20 wt %, it may be difficult to secure the sufficient corrosion resistance and alkali resistance, whereas when the water-soluble polyurethane resin exceeds 40 wt %, since the content of the silane-based sol-gel resin and inorganic compound in the surface treatment composition is relatively reduced, the corrosion resistance may rather deteriorate and the blackening resistance may deteriorate.

The silane-based sol-gel resin in which the three types of silane compounds are cross-linked may be contained to improve the corrosion resistance and scratch resistance, and may be obtained from a polymer of a first silane which is one type selected from the group consisting of tetraethylortho silicate, tetramethoxy silane, methyltrimethoxy silane, methyltriethoxy silane, dimethyldimethoxy silane, and dimethyldiethoxy silane; a second silane which is one type selected from the group consisting of 3-glycyloxypropyl-trimethoxy silane, 2-(3,4 epoxycyclohexyl-ethyltrimethoxy silane, 3-glycyloxypropyltrimethoxy silane, and 3-glycyloxypropylmethyldiethoxy silane; and a third silane which is one type selected from the group consisting of 3-aminopropyl-triethoxysilane, N-(2-aminoethyl)3-aminopropylmethyldimethoxy silane, N-(2-aminoethyl)3-aminopropyl trimethoxy silane, and N-(2-aminoethyl)3-aminopropyltriethoxy silane.

The silane-based sol-gel resin in which the three types of silane compounds are cross-linked may be preferably 40 to 60 wt % based on 100 wt % of the solid content of the surface treatment composition. When the silane-based sol-gel resin is added in an amount of less than 40 wt %, there may be a problem in that it is difficult to secure the desired corrosion resistance and scratch resistance, whereas, when the silane-based sol-gel resin exceeds 60 wt %, there may be a problem in workability due to a brittle coating film.

The curing agent is contained to form a strong organic resin film by cross-linking the water-soluble polyurethane resin, which is the main resin of the surface treatment composition, with a water-soluble acrylic emulsion resin, which is an auxiliary main resin.

The curing agent is at least one selected from the group consisting of a melamine-based curing agent, a carbodiimide-based curing agent, a blockisocyanate-based curing agent, an aziridine-based curing agent, and an oxazoline-based curing agent.

The curing agent may be preferably contained in an amount of 5 to 15 wt % based on 100 wt % of the solid content of the surface treatment composition. When the content of the curing agent is less than 5 wt %, since sufficient cross-linking is not formed, improvement in physical properties may not be expected, and when the content of the curing agent exceeds 15 wt %, the stability of the solution may deteriorate due to the excessive cross-linking, and therefore, solidification may occur over time. The curing agent may be, for example, 7 to 15 wt % and 10 to 15 wt %, and preferably, 10 to 15 wt %.

The anti-rust corrosion resistance agent is a material contained to improve the corrosion resistance of the surface treatment composition, and at least one anti-rust corrosion resistance agent selected from the group consisting of a phosphoric acid-based compound, a fluorine-based compound, a vanadium-based compound, a cerium salt-based compound, and a selenium salt-based compound may be used.

The anti-rust corrosion resistance agent may be preferably contained in an amount of 0.5 to 1.5 wt % based on 100 wt % of the solid content of the surface treatment composition. When the anti-rust corrosion resistance agent is added in an amount of less than 0.5 wt %, it may be difficult to secure the desired corrosion resistance, whereas when the anti-rust corrosion resistance agent exceeds 1.5 wt %, it may be difficult to secure the blackening resistance and alkali resistance.

The molybdenum-based compound is contained to improve the blackening resistance of the surface treatment composition, and the molybdenum-based compound is at least one selected from the group consisting of molybdenum oxide, molybdenum sulfide, molybdenum acetate, molybdenum phosphate, molybdenum carbide, molybdenum chloride, and molybdenum nitride.

The molybdenum-based compound may be preferably contained in an amount of 0.1 to 1 wt % based on 100 wt % of the solid content of the surface treatment composition. When the content of the molybdenum-based compound is less than 0.1 wt %, there may be a problem in securing the blackening resistance, whereas when the content of the molybdenum-based compound exceeds 1 wt %, it is not preferable because the improvement effect of the blackening resistance is insignificant and the corrosion resistance tends to decrease significantly. Meanwhile, in using the molybdenum-based compound as an inorganic binder, it is not preferable because the corrosion resistance may be significantly reduced when the molybdenum-based compound is added in a blending form in a combination other than the inorganic binder.

The surface treatment composition of the present disclosure may include a silane coupling agent to perform a coupling reaction by denaturing the water-soluble organic resin in order to form a strong bond between the water-soluble organic resin and the inorganic compound of the surface treatment composition.

The silane coupling agent may be at least one selected from the group consisting of vinyl triethoxy silane, 3-glycyloxyproc trimethoxysilane, 3-glycyloxypropyl triethoxysilane, 3-glycyloxypropylmethyl dimethoxy silane, N-2-(amino ethyl)-3-aminopropyl triethoxy silane, 3-aminopropyl trimethoxy silane, 3-aminopropyl triethoxy silane, and 2-perfluoro octyl ethyl trimethoxy silane.

The silane coupling agent may be preferably contained in an amount of 1.0 to 3.0 wt % based on 100 wt % of the solid content of the surface treatment composition. When the content of the silane compound is less than 1.0 wt %, it may be difficult to secure the corrosion resistance and water repellency, whereas even when the content of the silane compound exceeds 3.0 wt %, the effect on the increase in the corrosion resistance and water repellency is not large, and therefore, it is not preferable from an economical point of view.

The organometallic complex is added to improve the corrosion resistance by improving bonding adhesion between the surface treatment composition and the material steel sheet. The organometallic complex may be at least one selected from the group consisting of a silane-based compound, a titanium-based compound, and a zirconium-based compound.

The organometallic complex may be preferably contained in an amount of 1.0 to 2.0 wt % based on 100 wt % of the solid content of the surface treatment composition. When the content of the organometallic complex is less than 1.0 wt %, the adhesion between the surface treatment composition and the steel sheet and the corrosion resistance may deteriorate, and when the content of the organometallic complex exceeds 2.0 wt %, there may be no further the synergistic effect of the adhesion and corrosion resistance, and the storage stability may not be secured.

In the surface treatment composition of the present disclosure, the acid scavenger may be added to control the residual acid present in the surface treatment composition to prevent the blackening resistance and corrosion resistance from decreasing, and at least one selected from the group consisting of a carboimide-based compound and an oxazoline-based compound may be used.

The acid scavenger may be preferably contained in an amount of 1.0 to 2.0 wt % based on 100 wt % of the solid content of the surface treatment composition. When the acid scavenger is less than 1.0 wt %, the effect of improving the blackening resistance and preventing the corrosion resistance from decreasing is not expressed, whereas when the acid scavenger exceeds 2.0 wt %, there is no further improvement in the blackening resistance and prevention of the deterioration in the corrosion resistance, and the storage stability may not be secured.

The surface treatment composition of the present disclosure may include an aluminum-based compound to improve the blackening resistance through the surface treatment composition. The aluminum-based compound may be at least one selected from the group consisting of aluminum oxide, aluminum hydroxide, aluminum chloride, aluminum sulfate, aluminum nitrate, aluminum carbonate, aluminum acetate, aluminum silicate, aluminum phosphate, aluminum fluoride, and aluminum nitride.

The aluminum-based compound may be preferably contained in an amount of 0.1 to 1.0 wt % based on 100 wt % of the solid content of the surface treatment composition. When the aluminum-based compound is less than 0.1 wt %, there may be a problem in that it is difficult to secure the blackening resistance, whereas when the aluminum-based compound exceeds 1.0 wt %, the water resistance may deteriorate, which may not be preferable.

The lubricant may impart lubricity to the chrome-free surface treatment composition, and may serve to improve workability by lubrication properties, especially during the customer's working process. The lubricant may be at least one selected from the group consisting of paraffin-based wax, olefin-based wax, carnauba-based wax, polyester-based wax, polyethylene-based wax, polypropylene-based wax, polyethylene-Teflon-based wax, and polyteflon-based wax.

The lubricant may be preferably contained in an amount of 1.0 to 2.0 wt % based on 100 wt % of the solid content of the surface treatment composition. When the lubricant is less than 1.0 wt %, the slipperiness of the surface treatment composition may be insufficient, and thus, the surface treatment layer and material may be damaged during the press processing on the steel sheet surface-treated later, whereas, when the lubricant exceeds 2.0 wt %, excessive lubricant particles may be distributed on the surface of the coating film, and thus, the corrosion resistance may rather deteriorate.

The surface treatment composition of the present disclosure may include water as a solvent to dilute each component. The water means deionized water or distilled water. The solvent may be included as the balance in addition to each component of the present disclosure, and the content of the solvent may be 80 to 90 wt %.

Furthermore, the surface treatment solution composition of the present disclosure may contain alcohol as an auxiliary solvent for securing the solution stability, and the alcohol may be ethanol or isopropyl alcohol. The alcohol may be preferably included in an amount of 3 to 5 wt % in the total solvent.

According to another exemplary embodiment in the present disclosure, there may be provided a ternary hot-dip galvannealed steel sheet surface-treated with the above-described surface treatment solution composition.

Specifically, there may be provided a surface-treated ternary hot-dip galvannealed steel sheet including: a steel sheet; a ternary hot-dip galvannealed layer formed on at least one surface of the steel sheet; and a surface-treated film layer formed on the ternary hot-dip galvannealed layer, in which the surface-treated film layer may be formed of the above-described surface treatment composition.

The ternary hot-dip galvannealed layer may be preferably a ternary hot-dip galvannealed steel containing 0.2 to 15 wt % of Al, 0.5 to 3.5 wt % of Mg, the balance Zn and unavoidable impurities.

Furthermore, an interface between the base steel sheet and the ternary hot-dip galvannealed layer may include an Al-enriched layer, and an area ratio occupied by the Al-enriched layer may be 70% or more (including 100%), and more preferably, 73% or more (including 100%). Here, the occupied area ratio refers to an area ratio of the Al-enriched layer compared to an area of base iron when a plane is assumed without considering three-dimensional bending or the like when viewed from the surface of the hot-dip galvannealed steel sheet in a thickness direction of the base iron. When the occupied area ratio of the Al-enriched layer is secured in 70% or more, the Al-enriched layer may have a form in which fine particles are continuously formed, to thereby remarkably improve plating properties and plating adhesion.

In the ternary hot-dip galvanized steel sheet of the present disclosure, Mg may play an important role for improving the corrosion resistance of the ternary hot-dip galvanized steel sheet, and form a dense zinc hydroxide-based corrosion product on the surface of the plated layer under the corrosive environment to effectively prevent the corrosion of the ternary hot-dip galvanized steel sheet.

In order to secure the desired corrosion resistance effect in the present disclosure, the Mg may be included in 0.5 wt % or more, and more preferably, 0.9 wt % or more. However, when the content of the Mg is excessive, Mg oxidative dross rapidly may increase on the surface of a plating bath, and thus, the anti-oxidation effect may be canceled by the addition of trace elements. To prevent this, the Mg may be preferably included in an amount of 3.5 wt % or less, and more preferably, may be included in an amount of 3.2 wt % or less.

In the ternary hot-dip galvannealed steel sheet of the present disclosure, Al may suppress the formation of the Mg oxide dross in the plating bath, and react with Zn and Mg in the plating bath to form a Zn—Al—Mg-based intermetallic compound, to thereby improve the corrosion resistance of the plated steel sheet.

In order to obtain this effect in the present disclosure, Al may be included in 0.2 wt % or more, and more preferably, in 0.9 wt % or more. However, if the content of the Al is excessive, the weldability and phosphate treatment properties of the plated steel sheet may deteriorate. To prevent this, the Al may be preferably included in an amount of 15 wt % or less, and more preferably, may be included in an amount of 12 wt % or less.

The surface-treated film layer is a coating layer on which the above-described surface treatment composition has been dried, and corresponds to a component remaining after all volatile substances included in the surface-treated film layer are volatilized. For this reason, the surface-treated film layer does not contain water or alcohol as a solvent, and does not also contain the solvent contained in the surface treatment component. Therefore, the components included in the surface-treated film layer containing the organic resin and inorganic compound correspond to the content based on 100 wt % of the total solid content.

Since the detailed description of each component of the surface-treated film layer has been described in detail in the surface-treated film composition, the description thereof will be omitted herein.

According to another exemplary embodiment in the present disclosure, there is provided a method of manufacturing a surface-treated ternary hot-dip galvannealed steel sheet including: coating the above-described surface treatment composition on the ternary hot-dip galvannealed steel sheet on which a ternary hot-dip galvannealed layer is formed; and drying the coated surface treatment composition to form a surface-treated film layer.

The method of manufacturing a surface-treated ternary hot-dip galvannealed steel sheet may include coating the surface treatment composition as described above provided by the exemplary embodiment in the present disclosure on the surface of the plating layer of the ternary hot-dip galvannealed steel sheet. The surface treatment composition may be coated to a thickness of 1.5 to 30 μm. The surface treatment solution composition coated to the thickness may have a dry film layer thickness of 0.3 to 3 μm through the drying process.

When the thickness of the surface treatment solution composition is less than 1.5 μm, the surface treatment solution composition is thinly applied to the acid part of the roughness of the steel sheet, and thus, there may be a problem that the corrosion resistance deteriorates, and when the thickness of the surface treatment solution composition exceeds than 30 μm, there may be a problem in that weldability, workability, and the like deteriorate due to the formation of the thick film layer.

The method of coating a surface treatment solution composition is not particularly limited as long as it is a usually performed coating method, but for example, roll coating, spraying, immersion, spray squeezing, immersion squeezing, and the like may be used.

The process of drying the surface treatment solution composition coated on the hot-dip galvannealed steel sheet is preferably performed at a temperature of 70 to 150° C. based on the peak metal temperature (PMT) of the material steel sheet. When the drying temperature is less than 70° C. based on the peak metal temperature (PMT) of the material steel sheet, the curing reaction of the organic resin may not be performed completely, so the formation of the strong film structure may be insufficient, and the corrosion resistance and the alkali resistance may deteriorate, when the drying temperature exceeds 150° C., the work productivity may deteriorate due to the generation of steam and fume during the water cooling process, and the surface quality of the product may deteriorate due to the dew condensation phenomenon in which the evaporated steam is condensed on the upper portion of the drying equipment.

The drying may be preferably performed in a hot air drying furnace or an induction heating furnace. In the case of drying the surface treatment coating composition using the hot air drying furnace, it is preferable that the internal temperature of the hot air drying furnace is 100 to 250° C. On the other hand, in the case of drying the surface treatment coating composition using the induction heating furnace, the current applied to the induction heating furnace may be preferably 1000 to 4500 A, and more preferably 1500 to 3500 A.

When the internal temperature of the hot air drying furnace is less than 100° C. or the current applied to the induction heating furnace is less than 1000 A, the curing reaction of the surface treatment coating composition is not performed completely, so the corrosion resistance and the alkali resistance may deteriorate. In addition, when the internal temperature of the hot air drying furnace exceeds 250° C. or the current applied to the induction heating furnace exceeds 4500 A, the work productivity deteriorates due to the generation of the steam and fume during the water cooling process, and the surface quality of product may deteriorate due to the dew condensation phenomenon in which the evaporated steam is condensed on the upper portion of the drying facility.

In addition, after drying the surface treatment solution composition to form the surface-treated film layer, the surface-treated film layer may be cooled with water to provide a finally surface-treated ternary hot-dip galvannealed steel sheet.

The method of manufacturing a ternary hot-dip galvannealed steel sheet according to the exemplary embodiment in the present disclosure may be made in a continuous process, and the speed of the continuous process may be preferably 80 to 120 mpm. When the continuous process speed is less than 80 mpm, a problem of lowering productivity may occur, and when the continuous process speed exceeds 120 mpm, the solution may scatter in the process of drying the surface treatment solution composition, to thereby cause surface defects.

MODE FOR INVENTION

Hereinafter, the present disclosure will be described in more detail through specific examples. The following examples are merely illustrative to help the understanding of the present disclosure, and the scope of the present disclosure is not limited thereto.

EXAMPLE

Test and Evaluation Method
The method and evaluation criteria for evaluating the physical properties of the surface-treated steel sheet in the present example are as follows.
<Corrosion Resistance of Plate>
According to the method specified in ASTM B117, a white rust occurrence rate of a steel sheet over time after a specimen was treated was measured. In this case, the evaluation criteria are as follows.
◎: White rust occurrence time is 144 hours or more
○: White rust occurrence time is 96 hours or more and less than 144 hours
Δ: White rust occurrence time is less than 55 hours and less than 96 hours
×: White rust occurrence time is less than 55 hours
<Corrosion Resistance of Processed Part>
After the specimen was pushed up to a height of 6 mm using an Erichsen tester, the degree of occurrence of white rust was measured when 24 hours had elapsed. In this case, the evaluation criteria are as follows.
◎: The occurrence of white rust is less than 5% after 48 hours
Δ: The occurrence of white rust is 5% or more and less than 7% after 48 hours
×: The occurrence of white rust is 7% or more after 48 hours
<Blackening Resistance>
By leaving a specimen in a thermo-hygrostat maintained at 50° C. and relative humidity of 95% for 120 hours, a change in color (color difference: ΔE) of the specimen before and after the test was observed. In this case, the evaluation criteria are as follows.
◎: ΔE 2
○: 2<ΔE≤3
Δ: 3<ΔE≤4
×: ΔE>4
<Alkali Resistance>
The specimen was immersed in an alkaline degreasing solution at 60° C. for 2 minutes, and washed with water, and after the air blowing, the color difference (ΔE) before/after the test was measured. As the alkaline degreasing solution, Finecleaner L 4460 A: 20 g/2.4 L+L 4460 B 12 g/2.4 L (pH=12) manufactured by Daehan Parkerizing Co., Ltd., was used. In this case, the evaluation criteria are as follows.
◎: ΔE≤2
○: 2<ΔE≤3
Δ: 3<ΔE≤4
×: ΔE>4
<Weldability>
Weldability was evaluated using a pneumatic AC spot welding machine to maintain constant strength without spatter at a pressing force of 250 kg, a welding time of 15 cycles, and a conduction current of 7.5 kA. In this case, the evaluation criteria are as follows.
○: Weldable
Δ: Weldable, but poor quality
×: Not weldable
<Solution Stability>
After storing 200 milliliters of the prepared surface treatment solution composition in an oven at a temperature of 50° C., it was evaluated by observing the presence or absence of precipitation or gelation after 7 days. In this case, the evaluation criteria are as follows.
○: Good
×: Bad Example 1: Changes in Physical Properties According to Content of Water-Soluble Polyurethane Resin A surface treatment solution composition was prepared by using a cationic polyurethane resin in which polyester polyol has a hydroxyl value of 120 mgKOH/g and a weight average molecular weight of 3,000 as a water-soluble polyurethane resin, a polymer using methyltrimethoxy silane, 3-glycidoxypropyltrimethoxy silane, and N-(2-aminoethyl)3-aminopropyltriethoxy silane as a silane-based sol-gel resin in which the three types of silane compounds are cross-linked, melamine curing agent (CYMEL 303) as a curing agent, a vanadium-based anti-rust corrosion resistance agent as an anti-rust corrosion resistance agent, molybdenum sulfide as a molybdenum-based compound, 2-perfluorooctyl ethyl trimethoxy silane as a silane coupling agent, a titanium-based compound as an organometallic complex, an oxazoline-based acid scavenger as an acid scavenger, aluminum nitride as an aluminum-based compound, and polyethylene-Teflon wax as a lubricant, in the amount shown in Table 1 based on 100 wt % of solid content, and mixing the solid content with 81.4 wt % of water and 3.4 wt % of ethanol as a solvent.

A ternary hot-dip galvannealed steel sheet (one-sided coating thickness of 0.5 to 2.0 μm) in which a plating layer is formed of 1.5 wt % of Mg, 1.5 wt % of Al, and the balance Zn in wt % was cut to a size of 7 cm×15 cm (width×length), and thus, the ternary hot-dip galvanized steel sheet without oil was prepared. The hot-dip galvanized steel sheet included an Al-enriched layer at the interface between the plating layer and the base steel sheet, and the occupied area ratio of the Al-enriched layer was 85%. Thereafter, the specimen for testing was prepared by applying the surface treatment solution composition to the surface of the ternary hot-dip galvanized steel sheet to a thickness of 7 μm with a bar coater, and then curing the surface treatment solution composition under the conditions of the peak metal temperature (PMT) (base surface temperature) of 120±20° C.

The corrosion resistance of the plate, the corrosion resistance of the processed part, the blackening resistance, and alkali resistance were evaluated for the hot-dip galvanized steel sheet having the coating layer as described above, and the results were shown in Table 1.

TABLE 1

| Division | Composition of Composition (wt %) | | | | | | | |
|---|---|---|---|---|---|---|---|---|
| | Polyurethane resin | Sol-gel resin | Curing agent | Anti-rust corrosion resistance agent | Molybdenum-based compound | Silane coupling agent | Organometallic complex | Acid scavenger |
| Comparative Example 1 | 18 | 60 | 13.5 | 1 | 0.5 | 2 | 1.5 | 1.5 |
| Inventive Example 1 | 20 | 60 | 11.5 | 1 | 0.5 | 2 | 1.5 | 1.5 |
| Inventive Example 2 | 30 | 50 | 11.5 | 1 | 0.5 | 2 | 1.5 | 1.5 |
| Inventive Example 3 | 40 | 40 | 11.5 | 1 | 0.5 | 2 | 1.5 | 1.5 |
| Comparative Example 2 | 42 | 40 | 9.5 | 1 | 0.5 | 2 | 1.5 | 1.5 |

| Division | Composition of Composition (wt %) | | Corrosion resistance of plate | Corrosion resistance of processed part | Blackening resistance | Alkali resistance |
|---|---|---|---|---|---|---|
| | Aluminum-based compound | Lubricant | | | | |
| Comparative Example 1 | 0.5 | 1.5 | X | X | ○ | X |
| Inventive Example 1 | 0.5 | 1.5 | ○ | ◎ | ○ | ○ |
| Inventive Example 2 | 0.5 | 1.5 | ◎ | ◎ | ◎ | ◎ |
| Inventive Example 3 | 0.5 | 1.5 | ◎ | ◎ | ◎ | ◎ |
| Comparative Example 2 | 0.5 | 1.5 | X | X | X | ○ |

* The content of the composition is based on 15 wt % of solid content

As shown in Table 1, Inventive Examples 1 to 3, in which the content of the water-soluble polyurethane resin satisfies the content suggested by the present disclosure, showed good or better results in all physical properties.

On the other hand, Comparative Example 1, in which too little water-soluble polyurethane resin was added, showed poor results in the corrosion resistance of the plate, the corrosion resistance of the processed part, and the alkali resistance, and Comparative Example 2, in which too much water-soluble polyurethane resin was added, showed poor results in the corrosion resistance of the plate, the corrosion resistance of the processed part, and the blackening resistance.

Example 2: Change in Physical Properties According to Content of Silane-Based Sol-Gel Resin The same composition component as in Example 1 was used in an amount as shown in Table 2 based on 100 parts by weight of solid content, and the solid content was mixed with 81.4 wt % of water and 3.4 wt % of ethanol as a solvent to prepare a surface treatment solution composition.

The specimen for testing was prepared in the same manner as in Example 1 using the surface treatment solution composition, and the corrosion resistance of the plate, the corrosion resistance of the processed part, the blackening resistance, and the alkali resistance was evaluated, and the results were shown in Table 2.

TABLE 2

| Division | Composition of composition (wt %) | | | | | | |
|---|---|---|---|---|---|---|---|
| | Sol-Gel resin | Polyurethane resin | Curing agent | Anti-rust corrosion resistance agent | Molybdenum-based compound | Silane coupling agent | Organometallic complex |
| Comparative Example 3 | 38 | 40 | 13.5 | 1 | 0.5 | 2 | 1.5 |
| Inventive Example 4 | 40 | 40 | 11.5 | 1 | 0.5 | 2 | 1.5 |

TABLE 2-continued

| Division | | | | | | |
|---|---|---|---|---|---|---|
| Inventive Example 5 | 50 | 30 | 11.5 | 1 | 0.5 | 2 | 1.5 |
| Inventive Example 6 | 60 | 20 | 11.5 | 1 | 0.5 | 2 | 1.5 |
| Comparative Example 4 | 62 | 20 | 9.5 | 1 | 0.5 | 2 | 1.5 |

| | Composition of composition (wt %) | | | Corrosion | | | |
|---|---|---|---|---|---|---|---|
| Division | Acid scavenger | Aluminum-based compound | Lubricant | Corrosion resistance of plate | resitance of processed part | Blackening resistance | Alkali resistance |
| Comparative Example 3 | 1.5 | 0.5 | 1.5 | X | X | ○ | ○ |
| Inventive Example 4 | 1.5 | 0.5 | 1.5 | ○ | ⊚ | ○ | ○ |
| Inventive Example 5 | 1.5 | 0.5 | 1.5 | ⊚ | ⊚ | ⊚ | ⊚ |
| Inventive Example 6 | 1.5 | 0.5 | 1.5 | ⊚ | ⊚ | ⊚ | ⊚ |
| Comparative Example 4 | 1.5 | 0.5 | 1.5 | X | X | X | ○ |

* The content of the composition is based on 15 wt % of solid content

As shown in Table 2, Inventive Examples 4 to 6, in which the content of the silane-based sol-gel resin satisfies the content suggested by the present disclosure, showed good or better results in all physical properties.

On the other hand, Comparative Example 3, in which too little silane-based Sol-gel resin was added, showed poor results in the corrosion resistance of the plate and the corrosion resistance of the processed part, and Comparative Example 4, in which too much silane-based Sol-gel resin was added, showed poor results in the corrosion resistance of the plate, the corrosion resistance of the processed part, and the blackening resistance.

Example 3: Change in Physical Properties According to Content of Curing Agent

The same composition component as in Example 1 was used in an amount as shown in Table 3 based on 100 parts by weight of solid content, and the solid content was mixed with 81.4 wt % of water and 3.4 wt % of ethanol as a solvent to prepare a surface treatment solution composition.

A specimen for testing was prepared in the same manner as in Example 1 using the surface treatment solution composition.

The corrosion resistance of the plate, the corrosion resistance of the processed part, the blackening resistance, the alkali resistance, and the solution stability were evaluated for the hot-dip galvanized steel sheet having the coating layer as described above, and the results were shown in Table 3.

TABLE 3

| | Composition of composition (wt %) | | | | | | | |
|---|---|---|---|---|---|---|---|---|
| Division | Curing agent | Polyurethane resin | Sol-Gel resin | Anti-rust corrosion resistance agent | Molybdenum-based compound | Silane coupling agent | Organometallic complex | Acid scavenger |
| Comparative Example 5 | 3 | 34 | 54.5 | 1 | 0.5 | 2 | 1.5 | 1.5 |
| Inventive Example 7 | 5 | 33 | 53.5 | 1 | 0.5 | 2 | 1.5 | 1.5 |
| Inventive Example 8 | 10 | 30 | 51.5 | 1 | 0.5 | 2 | 1.5 | 1.5 |
| Inventive Example 9 | 15 | 29 | 47.5 | 1 | 0.5 | 2 | 1.5 | 1.5 |
| Comparative Example 6 | 17 | 28 | 46.5 | 1 | 0.5 | 2 | 1.5 | 1.5 |

| | Composition of composition (wt %) | | Corrosion | | | | |
|---|---|---|---|---|---|---|---|
| Division | Aluminum-based compound | Lubricant | Corrosion resistance of plate | resistance of processed part | Blackening resistance | Alkali resistance | Solution stability |
| Comparative Example 5 | 0.5 | 1.5 | X | X | X | X | ○ |
| Inventive Example 7 | 0.5 | 1.5 | ○ | ○ | ○ | ○ | ○ |
| Inventive Example 8 | 0.5 | 1.5 | ⊚ | ⊚ | ⊚ | ⊚ | ○ |

TABLE 3-continued

| | | | | | | | |
|---|---|---|---|---|---|---|---|
| Inventive Example 9 | 0.5 | 1.5 | ◎ | ◎ | ○ | ◎ | ○ |
| Comparative Example 6 | 0.5 | 1.5 | ○ | ○ | ○ | X | X |

* The content of the composition is based on 15 wt % of solid content

As shown in Table 3, Inventive Examples 7 to 9, in which the content of the melamine curing agent satisfies the content suggested by the present disclosure, showed good or better results in all physical properties.

On the other hand, Comparative Example 5, in which too little melamine curing agent was added, showed poor results in all physical properties except the solution stability, and Comparative Example 6, in which too much melamine curing agent was added, showed poor results in the alkali resistance and the solution stability.

Example 4: Change in Physical Properties According to Content of an Anti-Rust Corrosion Resistance Agent The same composition component as in Example 1 was used in an amount as shown in Table 4 based on 100 parts by weight of solid content, and the solid content was mixed with 81.4 wt % of water and 3.4 wt % of ethanol as a solvent to prepare a surface treatment solution composition.

A specimen for testing was prepared in the same manner as in Example 1 using the surface treatment solution composition.

The corrosion resistance of the plate, the corrosion resistance of the processed part, the blackening resistance, the alkali resistance, and the solution stability were evaluated for the hot-dip galvanized steel sheet having the coating layer as described above, and the results were shown in Table 4.

As shown in Table 4, Inventive Examples 10 to 12, in which the content of the anti-rust corrosion resistance agent satisfies the content suggested by the present disclosure, showed good or better results in all physical properties.

On the other hand, Comparative Example 7, in which too little anti-rust corrosion resistance agent was added, showed poor results in the corrosion resistance of the plate and the corrosion resistance after the processing, and Comparative Example 8, in which too much anti-rust corrosion resistance agent was added, had weak alkali resistance and poor blackening resistance due to moisture absorbing action.

Example 5: Change in Physical Properties According to Content of a Molybdenum-Based Compound The same composition component as in Example 1 was used in an amount as shown in Table 5 based on 100 parts by weight of solid content, and the solid content was mixed with 81.4 wt % of water and 3.4 wt % of ethanol as a solvent to prepare a surface treatment solution composition.

A specimen for testing was prepared in the same manner as in Example 1 using the surface treatment solution composition.

The corrosion resistance of the plate, the corrosion resistance of the processed part, the blackening resistance, the alkali resistance, and the solution stability were evaluated for the hot-dip galvanized steel sheet having the coating layer as described above, and the results were shown in Table 5.

TABLE 4

| | Composition of composition (wt %) | | | | | | | | | | | | | |
|---|---|---|---|---|---|---|---|---|---|---|---|---|---|---|
| Division | Anti-rust corrosion resistance agent | Polyure-thane resin | Sol-Gel 수지 | curing agent | Molyb-denum-based com-pound | Silane coupling agent | Organo metallic complex | Acid scaven-ger | Alumi-num-based com-pound | Lubri-cant | Corrosion resistance of plate | Corrosion resistance of processed part | Black-ening resis-tance | Alkali resis-tance |
| Comparative Example 7 | 0.3 | 30 | 50 | 12.2 | 0.5 | 2 | 1.5 | 1.5 | 0.5 | 1.5 | X | X | ○ | ○ |
| Inventive Example 10 | 0.5 | 30 | 50 | 12 | 0.5 | 2 | 1.5 | 1.5 | 0.5 | 1.5 | ○ | ◎ | ○ | ○ |
| Inventive Example 11 | 1 | 30 | 50 | 11.5 | 0.5 | 2 | 1.5 | 1.5 | 0.5 | 1.5 | ◎ | ◎ | ◎ | ◎ |
| Inventive Example 12 | 1.5 | 30 | 50 | 11 | 0.5 | 2 | 1.5 | 1.5 | 0.5 | 1.5 | ◎ | ◎ | ◎ | ◎ |
| Comparative Example 8 | 1.7 | 30 | 50 | 10.8 | 0.5 | 2 | 1.5 | 1.5 | 0.5 | 1.5 | ○ | ○ | X | X |

* The content of the composition is based on 15 wt % of solid content

TABLE 5

| Division | Composition of composition (wt %) | | | | | | | | | | Corrosion resistance of plate | Corrosion resistance of processed part | Blackening resistance | Alkali resistance |
|---|---|---|---|---|---|---|---|---|---|---|---|---|---|---|
| | Molybdenum-based compound | Polyurethane resin | Sol-Gel resin | Curing agent | Anti-rust corrosion resistance agent | Silane coupling agent | Organo metallic complex | Acid scavenger | Aluminum-based compound | Lubricant | | | | |
| Comparative Example 9 | 0.05 | 30 | 50 | 11.95 | 1 | 2 | 1.5 | 1.5 | 0.5 | 1.5 | ○ | ○ | X | ○ |
| Inventive Example 13 | 0.1 | 30 | 50 | 11.9 | 1 | 2 | 1.5 | 1.5 | 0.5 | 1.5 | ○ | ○ | ○ | ○ |
| Inventive Example 14 | 0.5 | 30 | 50 | 11.5 | 1 | 2 | 1.5 | 1.5 | 0.5 | 1.5 | ◎ | ◎ | ◎ | ◎ |
| Inventive Example 15 | 1 | 30 | 50 | 11 | 1 | 2 | 1.5 | 1.5 | 0.5 | 1.5 | ◎ | ◎ | ○ | ◎ |
| Comparative Example 10 | 1.2 | 30 | 50 | 10.8 | 1 | 2 | 1.5 | 1.5 | 0.5 | 1.5 | X | X | ○ | ○ |

* The content of the composition is based on 15 wt % of solid content

As shown in Table 5, Inventive Examples 13 to 15, in which the content of the molybdenum-based compound satisfies the content suggested by the present disclosure, showed good or better results in all physical properties.

On the other hand, Comparative Example 9, in which too little molybdenum-based compound was added, showed poor results in the blackening resistance, and Comparative Example 10, in which too much molybdenum-based compound was added, showed poor results in the corrosion resistance of the plate and the corrosion resistance of the processed part.

Example 6: Change in Physical Properties According to Content of a Silane Coupling Agent The same composition component as in Example 1 was used in an amount as shown in Table 6 based on 100 parts by weight of solid content, and the solid content was mixed with 81.4 wt % of water and 3.4 wt % of ethanol as a solvent to prepare a surface treatment solution composition.

A specimen for testing was prepared in the same manner as in Example 1 using the surface treatment solution composition.

The corrosion resistance of the plate, the corrosion resistance of the processed part, the blackening resistance, the alkali resistance, and the solution stability were evaluated for the hot-dip galvanized steel sheet having the coating layer as described above, and the results were shown in Table 6.

TABLE 6

| Division | Composition of composition (wt %) | | | | | | | | | | Corrosion resistance of plate | Corrosion resistance of processed part | Blackening resistance | Alkali resistance |
|---|---|---|---|---|---|---|---|---|---|---|---|---|---|---|
| | Silane coupling agent | Polyurethane resin | Sol-Gel resin | Curing agent | Anti-rust corrosion resistance agent | Molybdenum-based compound | Organo metallic complex | Acid scavenger | Aluminum-based compound | Lubricant | | | | |
| Comparative Example 11 | 0.5 | 30 | 50 | 13 | 1 | 0.5 | 1.5 | 1.5 | 0.5 | 1.5 | X | X | X | ○ |
| Inventive Example 16 | 1 | 30 | 50 | 12.5 | 1 | 0.5 | 1.5 | 1.5 | 0.5 | 1.5 | ○ | ◎ | ○ | ○ |
| Inventive Example 17 | 2 | 30 | 50 | 11.5 | 1 | 0.5 | 1.5 | 1.5 | 0.5 | 1.5 | ◎ | ◎ | ◎ | ◎ |
| Inventive Example 18 | 3 | 30 | 50 | 10.5 | 1 | 0.5 | 1.5 | 1.5 | 0.5 | 1.5 | ◎ | ◎ | ◎ | ◎ |
| Comparative Example 12 | 3.5 | 30 | 50 | 10 | 1 | 0.5 | 1.5 | 1.5 | 0.5 | 1.5 | ○ | X | X | ○ |

* The content of the composition is based on 15 wt % of solid content

As shown in Table 6, Inventive Examples 16 to 18, in which the content of the silane coupling agent satisfies the content suggested by the present disclosure, showed good or better results in all physical properties.

On the other hand, Comparative Example 11, in which too little silane coupling agent was added, showed poor results in the corrosion resistance of the plate, the corrosion resistance of the processed part, and the blackening resistance, and Comparative Example 12, in which too much silane coupling agent was added, showed poor results in the corrosion resistance of the processed part and the blackening resistance due to the formation of a hard film due to the increased dryness of the film.

Example 7: Change in Physical Properties According to Content of an Organometallic Complex The same composition component as in Example 1 was used in an amount as shown in Table 7 based on 100 parts by weight of solid content, and the solid content was mixed with 81.4 wt % of water and 3.4 wt % of ethanol as a solvent to prepare a surface treatment solution composition.

A specimen for testing was prepared in the same manner as in Example 1 using the surface treatment solution composition.

The corrosion resistance of the plate, the corrosion resistance of the processed part, the blackening resistance, the alkali resistance, and the solution stability were evaluated for the hot-dip galvanized steel sheet having the coating layer as described above, and the results were shown in Table 7.

TABLE 7

| Division | Composition of composition (wt %) | | | | | | | | | | | | | | |
|---|---|---|---|---|---|---|---|---|---|---|---|---|---|---|---|
| | Organo metallic complex | Polyure- thane resin | Sol- Gel resin | Curing agent | Anti-rust corrosion resistance agent | Molyb- denum- based com- pound | Silane cou- pling agent | Acid scaven- ger | Alumi- num- based com- pound | Lubri- cant | Corro- sion resis- tance of plate | Corrosion resistance of processed part | Black- ening resis- tance | Alkali resis- tance | Solu- tion stabil- ity |
| Comparative Example 13 | 0.8 | 30 | 50 | 12.2 | 1 | 0.5 | 2 | 1.5 | 0.5 | 1.5 | X | X | X | ○ | ◎ |
| Inventive Example 19 | 1 | 30 | 50 | 12 | 1 | 0.5 | 2 | 1.5 | 0.5 | 1.5 | ○ | ○ | ○ | ○ | ◎ |
| Inventive Example 20 | 1.5 | 30 | 50 | 11.5 | 1 | 0.5 | 2 | 1.5 | 0.5 | 1.5 | ◎ | ◎ | ◎ | ◎ | ◎ |
| Inventive Example 21 | 2 | 30 | 50 | 11 | 1 | 0.5 | 2 | 1.5 | 0.5 | 1.5 | ◎ | ◎ | ◎ | ◎ | ○ |
| Comparative Example 14 | 2.3 | 30 | 50 | 10.7 | 1 | 0.5 | 2 | 1.5 | 0.5 | 1.5 | ◎ | ◎ | ◎ | ◎ | X |

* The content of the composition is based on 15 wt % of solid content

As shown in Table 7, Inventive Examples 19 to 21, in which the content of the organometallic complex satisfies the content suggested by the present disclosure, showed good or better results in all physical properties.

On the other hand, Comparative Example 13, in which too little organometallic complex was added, showed poor results in the corrosion resistance of the plate, the corrosion resistance of the processed part, and the blackening resistance due to the deterioration in the adhesion and corrosion resistance between the surface treatment composition and the steel sheet, and Comparative Example 14, in which too much organometallic complex was added, had no further effect, and showed poor solution stability.

Example 8: Change in Physical Properties According to Content of an Acid Scavenger The same composition component as in Example 1 was used in an amount as shown in Table 8 based on 100 parts by weight of solid content, and the solid content was mixed with 81.4 wt % of water and 3.4 wt % of ethanol as a solvent to prepare a surface treatment solution composition.

A specimen for testing was prepared in the same manner as in Example 1 using the surface treatment solution composition.

The corrosion resistance of the plate, the corrosion resistance of the processed part, the blackening resistance, the alkali resistance, and the solution stability were evaluated for the hot-dip galvanized steel sheet having the coating layer as described above, and the results were shown in Table 8.

TABLE 8

| Division | Composition of composition (wt %) | | | | | | | | | | | | | | |
|---|---|---|---|---|---|---|---|---|---|---|---|---|---|---|---|
| | Acid scaven- ger | Polyure- thane resin | Sol- Gel resin | Curing agent | Anti-rust corrosion resistance agent | Molyb- denum- based com- pound | Silane cou- pling agent | Organo metallic complex | Alumi- num- based com- pound | Lubri- cant | Corro- sion resis- tance of plate | Corrosion resistance of processed part | Black- ening resis- tance | Alkali resis- tance | Solu- tion stabil- ity |
| Comparative Example 15 | 0.8 | 30 | 50 | 12.2 | 1 | 0.5 | 2 | 1.5 | 0.5 | 1.5 | X | X | X | ○ | ○ |
| Inventive Example 22 | 1 | 30 | 50 | 12 | 1 | 0.5 | 2 | 1.5 | 0.5 | 1.5 | ○ | ○ | ○ | ○ | ○ |
| Inventive Example 23 | 1.5 | 30 | 50 | 11.5 | 1 | 0.5 | 2 | 1.5 | 0.5 | 1.5 | ◎ | ◎ | ◎ | ◎ | ○ |
| Inventive Example 24 | 2 | 30 | 50 | 11 | 1 | 0.5 | 2 | 1.5 | 0.5 | 1.5 | ◎ | ◎ | ◎ | ◎ | ○ |
| Comparative Example 16 | 2.3 | 30 | 50 | 10.7 | 1 | 0.5 | 2 | 1.5 | 0.5 | 1.5 | ◎ | ◎ | ○ | ◎ | X |

* The content of the composition is based on 15 wt % of solid content

As shown in Table 8, Inventive Examples 22 to 24, in which the content of the acid scavenger satisfies the content suggested by the present disclosure, showed good or better results in all physical properties.

On the other hand, Comparative Example 15, in which too little acid scavenger was added, showed poor results in the corrosion resistance of the plate and the corrosion resistance of the processed part, and Comparative Example 16, in which too much was added, showed poor solution stability.

Example 9: Change in Physical Properties According to Content of an Aluminum-Based Compound The same composition component as in Example 1 was used in an amount as shown in Table 9 based on 100 parts by weight of solid content, and the solid content was mixed with 81.4 wt % of water and 3.4 wt % of ethanol as a solvent to prepare a surface treatment solution composition.

A specimen for testing was prepared in the same manner as in Example 1 using the surface treatment solution composition.

The corrosion resistance of the plate, the corrosion resistance of the processed part, the blackening resistance, the alkali resistance, and the solution stability were evaluated for the hot-dip galvanized steel sheet having the coating layer as described above, and the results were shown in Table 9.

TABLE 9

| Division | Composition of composition (wt %) | | | | | | | | | | Corrosion resistance of plate | Corrosion resistance of processed part | Blackening resistance | Alkali resistance |
|---|---|---|---|---|---|---|---|---|---|---|---|---|---|---|
| | Aluminum-based compound | Polyurethane resin | Sol-Gel resin | Curing agent | Anti-rust corrosion resistance agent | Molybdenum-based compound | Silane coupling agent | Organo metallic complex | Acid scavenger | Lubricant | | | | |
| Comparative Example 17 | 0.05 | 30 | 50 | 11.95 | 1 | 0.5 | 2 | 1.5 | 1.5 | 1.5 | ○ | ○ | X | ○ |
| Inventive Example 25 | 0.1 | 30 | 50 | 11.9 | 1 | 0.5 | 2 | 1.5 | 1.5 | 1.5 | ○ | ○ | ○ | ○ |
| Inventive Example 26 | 0.5 | 30 | 50 | 11.5 | 1 | 0.5 | 2 | 1.5 | 1.5 | 1.5 | ◎ | ◎ | ◎ | ◎ |
| Inventive Example 27 | 1 | 30 | 50 | 11 | 1 | 0.5 | 2 | 1.5 | 1.5 | 1.5 | ◎ | ◎ | ◎ | ◎ |
| Comparative Example 18 | 1.2 | 30 | 50 | 10.8 | 1 | 0.5 | 2 | 1.5 | 1.5 | 1.5 | ◎ | ◎ | ○ | X |

\* The content of the composition is based on 15 wt % of solid content

As shown in Table 9, Inventive Examples 25 to 27, in which the content of the aluminum-based compound satisfies the content suggested by the present disclosure, showed good or better results in all physical properties.

On the other hand, Comparative Example 17, in which too little aluminum-based compound was added, showed poor blackening resistance, and Comparative Example 18, in which too much aluminum-based compound was added, showed poor alkali resistance.

Example 10: Change in Physical Properties According to Lubricant

The same composition component as in Example 1 was used in an amount as shown in Table 10 based on 100 parts by weight of solid content, and the solid content was mixed with 81.4 wt % of water and 3.4 wt % of ethanol as a solvent to prepare a surface treatment solution composition.

A specimen for testing was prepared in the same manner as in Example 1 using the surface treatment solution composition.

The corrosion resistance of the plate, the corrosion resistance of the processed part, the blackening resistance, the alkali resistance, and the solution stability were evaluated for the hot-dip galvanized steel sheet having the coating layer as described above, and the results were shown in Table 10.

TABLE 10

| Division | Composition of composition (wt %) | | | | | | | | | | Corrosion resistance of plate | Corrosion resistance of processed part | Blackening resistance | Alkali resistance |
|---|---|---|---|---|---|---|---|---|---|---|---|---|---|---|
| | Lubricant | Polyurethane resin | Sol-Gel resin | Curing agent | Anti-rust corrosion resistance agent | Molybdenum-based compound | Silane coupling agent | Organo metallic complex | Acid scavenger | Aluminum-based compound | | | | |
| Comparative Example 19 | 0.8 | 30 | 50 | 12.2 | 1 | 0.5 | 2 | 1.5 | 1.5 | 0.5 | ○ | X | ○ | ○ |
| Inventive Example 28 | 1 | 30 | 50 | 12 | 1 | 0.5 | 2 | 1.5 | 1.5 | 0.5 | ○ | ○ | ○ | ○ |
| Inventive Example 29 | 1.5 | 30 | 50 | 11.5 | 1 | 0.5 | 2 | 1.5 | 1.5 | 0.5 | ◎ | ◎ | ◎ | ◎ |

TABLE 10-continued

| Division | Lubricant | Polyurethane resin | Sol-Gel resin | Curing agent | Anti-rust corrosion resistance agent | Molybdenum-based compound | Silane coupling agent | Organo metallic complex | Acid scavenger | Aluminum-based compound | Corrosion resistance of plate | Corrosion resistance of processed part | Blackening resistance | Alkali resistance |
|---|---|---|---|---|---|---|---|---|---|---|---|---|---|---|
| Inventive Example 30 | 2 | 30 | 50 | 11 | 1 | 0.5 | 2 | 1.5 | 1.5 | 0.5 | ◎ | ◎ | ◎ | ◎ |
| Comparative Example 20 | 2.3 | 30 | 50 | 10.7 | 1 | 0.5 | 2 | 1.5 | 1.5 | 0.5 | X | X | r | D |

* The content of the composition is based on 15 wt % of solid content

As shown in Table 10, Inventive Examples 28 to 30, in which the content of the lubricant satisfies the content suggested by the present disclosure, showed good or better results in all physical properties.

On the other hand, Comparative Example 19, in which too little lubricant was added, showed poor results in the corrosion resistance of the processed part, and Comparative Example 20, in which too much lubricant was added, showed poor results in the corrosion resistance of the plate and the corrosion resistance of the processed part, and results of the deterioration in the blackening resistance and alkali resistance.

Example 11: Change in Physical Properties According to Thickness of Film Layer and Drying Temperature The surface treatment composition was prepared in the same manner as in Example 1, except that the composition of Inventive Example 2 was used, and the surface treatment composition was coated on a specimen, but the thickness of the coated film layer and the PMT temperature were controlled to the thicknesses shown in Table 11 below.

The corrosion resistance of the plate, the corrosion resistance of the processed part, the blackening resistance, the alkali resistance, and the weldability in the manufactured specimens were evaluated, and the results are shown in Table 11.

TABLE 11

| Division | Thickness of film layer (μm) | Drying temperature (° C.) | Corrosion resistance of plate | Corrosion resistance of processed part | Blackening resistance | Alkali resistance | Weldability |
|---|---|---|---|---|---|---|---|
| Comparative Example 19 | 0.1 | 120 | Δ | X | Δ | Δ | ○ |
| Inventive Example 65 | 0.3 | 120 | ◎ | ◎ | ◎ | ◎ | ○ |
| Inventive Example 66 | 1 | 120 | ◎ | ◎ | ◎ | ◎ | ○ |
| Inventive Example 67 | 2 | 120 | ◎ | ◎ | ○ | ◎ | ○ |
| Inventive Example 68 | 3 | 120 | ◎ | ◎ | ○ | ◎ | ○ |
| Comparative Example 20 | 3.5 | 120 | ◎ | ◎ | X | ◎ | X |
| Comparative Example 21 | 1 | 50 | X | X | X | X | ○ |
| Inventive Example 69 | 1 | 70 | ○ | ○ | ○ | Δ | ○ |
| Inventive Example 70 | 1 | 100 | ◎ | ◎ | ◎ | ◎ | ○ |
| Inventive Example 71 | 1 | 150 | ◎ | ◎ | ○ | ◎ | ○ |
| Comparative Example 22 | 1 | 170 | ◎ | ◎ | X | ◎ | ○ |

As shown in Table 11, Inventive Examples 65 to 68, in which the film layer was formed to have a thickness of 0.3 to 3.0 μm, showed good or better results in all physical properties. On the other hand, Comparative Example 19, in which the formed film was too thin, showed normal (Δ) results in the corrosion resistance of the plate, the blackening resistance, and the alkali resistance, and showed poor results in the corrosion resistance of the processed part. On the other hand, Comparative Example 20, which the film was formed too thickly, showed poor blackening resistance and weldability, and had no improved properties compared to Inventive Example 68, so the thickness of the film of Inventive Example 68 or higher was not required from the economic point of view.

In addition, as shown in Table 11, Inventive Examples 69 to 71, in which the film layer was formed at a drying temperature of 70 to 150° C., showed good or better results in all physical properties.

On the other hand, Comparative Example 21, in which the drying temperature was too low, showed poor results in all physical properties except for weldability due to the insufficient drying. On the other hand, Comparative Example 22, where the drying temperature was too high, showed poor blackening resistance due to fume drop on the steel sheet due to the condensation of water vapor generated in the steel sheet during the air cooling process (water cooling).

While exemplary embodiments have been shown and described above, it will be apparent to those skilled in the art that modifications and variations could be made without departing from the scope of the present disclosure as defined by the appended claims.

The invention claimed is:

1. A surface treatment composition, comprising:
based on 100 wt % of solid content of composition,
20 to 40 wt % of water-soluble polyurethane resin;
40 to 60 wt % of silane-based sol-gel resin in which three types of silane compounds are cross-linked;
5 to 15 wt % of curing agent;
0.5 to 1.5 wt % of an anti-rust corrosion resistance agent;
0.1 to 1.0 wt % of a molybdenum-based compound;
1.0 to 3.0 wt % of a silane coupling agent;
1.0 to 2.0 wt % of an organometallic complex;
1.0 to 2.0 wt % of an acid scavenger;
0.1 to 1.0 wt % of an aluminum-based compound; and
1.0 to 2.0 wt % of a lubricant.

2. The surface treatment composition of claim 1, wherein the water-soluble polyurethane-based resin is a reaction product of polyester polyol or polycarbonate polyol and a polyisocyanate compound.

3. The surface treatment composition of claim 1, wherein the silane-based sol-gel resin in which the three types of silane compounds are cross-linked is obtained from a polymer of
a first silane which is one type selected from the group consisting of tetraethylortho silicate, tetramethoxy silane, methyltrimethoxy silane, methyltriethoxy silane, dimethyldimethoxy silane, and dimethyldiethoxy silane;
a second silane which is one type selected from the group consisting of 3-glycyloxypropyl-trimethoxy silane, 2-(3,4 epoxycyclohexyl-ethyltrimethoxy silane, 3-glycyloxypropyltrimethoxy silane, 3-glycyloxypropylmethyldiethoxy silane; and
a third silane which is one type selected from the group consisting of 3-aminopropyl-triethoxysilane, N-(2-aminoethyl) 3-aminopropylmethyldimethoxy silane, N-(2-aminoethyl) 3-aminopropyl trimethoxy silane, and N-(2-aminoethyl) 3-aminopropyltriethoxy silane.

4. The surface treatment composition of claim 1, wherein the curing agent is at least one selected from the group consisting of a melamine-based curing agent, a carbodiimide-based curing agent, a blockisocyanate-based curing agent, an aziridine-based curing agent, and an oxazoline-based curing agent.

5. The surface treatment composition of claim 1, wherein the anti-rust corrosion resistance agent is at least one selected from the group consisting of a phosphoric acid-based compound, a fluorine-based compound, a vanadium-based compound, a cerium salt-based compound, and a selenium salt-based compound.

6. The surface treatment composition of claim 1, wherein the molybdenum-based compound is at least one selected from the group consisting of molybdenum oxide, molybdenum sulfide, molybdenum acetate, molybdenum phosphate, molybdenum carbide, molybdenum chloride, and molybdenum nitride.

7. The surface treatment composition of claim 1, wherein the silane coupling agent is at least one selected from the group consisting of vinyl triethoxy silane, 3-glycyloxyproc trimethoxysilane, 3-glycyloxypropyl triethoxysilane, 3-glycyloxypropylmethyl dimethoxy silane, N-2-(amino ethyl)-3-aminopropyl triethoxy silane, 3-aminopropyl trimethoxy silane, 3-aminopropyl triethoxy silane, and 2-perfluoro octyl ethyl trimethoxy silane.

8. The surface treatment composition of claim 1, wherein the organometallic complex is at least one selected from the group consisting of a silane-based compound, a titanium-based compound, and a zirconium-based compound.

9. The surface treatment composition of claim 1, wherein the acid scavenger is at least one selected from the group consisting of a carboimide-based compound and an oxazoline-based compound.

10. The surface treatment composition of claim 1, wherein the aluminum-based compound is at least one selected from the group consisting of aluminum oxide, aluminum hydroxide, aluminum chloride, aluminum sulfate, aluminum nitrate, aluminum carbonate, aluminum acetate, aluminum silicate, aluminum phosphate, aluminum fluoride, and aluminum nitride.

11. The surface treatment composition of claim 1, wherein the lubricant is at least one selected from the group consisting of paraffin-based wax, olefin-based wax, carnauba-based wax, polyester-based wax, polyethylene-based wax, and polypropylene-based wax.

12. A method of manufacturing a surface-treated ternary hot-dip galvannealed steel sheet, comprising:
coating the surface treatment composition of claim 1 on a ternary hot-dip galvannealed steel sheet on which a ternary hot-dip galvannealed layer is formed; and
drying the coated surface treatment composition to form a surface-treated film layer.

13. The method of claim 12, wherein the surface treatment solution composition is coated to a thickness of 1.5 to 30 μm.

14. The method of claim 12, wherein the coating is made by roll coating, spraying, immersion, spray squeezing, or immersion squeezing.

15. The method of claim 12, wherein the drying is performed at a temperature of 70 to 150° C. based on a material steel sheet peak metal temperature (PMT).

16. The method of claim 12, wherein the drying is performed in a hot air drying furnace or an induction heating furnace.

17. The method of claim 12, wherein the method of manufacturing a ternary hot-dip galvannealed steel sheet is performed in a continuous process, and a speed of the continuous process is 80 to 120 mpm.

18. A surface-treated ternary hot-dip galvannealed steel sheet, comprising:
a steel sheet;
a ternary hot-dip galvannealed layer formed on at least one surface of the steel sheet; and
a surface-treated film layer formed on the ternary hot-dip galvannealed layer,
wherein the surface-treated film layer is formed of the surface treatment composition of claim 1.

19. The surface-treated ternary hot-dip galvannealed steel sheet of claim 18, wherein the ternary hot-dip galvannealed layer includes an Al-enriched layer formed at an interface, and an area ratio occupied by the Al-enriched layer is 70% or more (including 100%).

20. The surface-treated ternary hot-dip galvannealed steel sheet of claim 18, wherein the ternary hot-dip galvannealed layer contains 0.2 to 15 wt % of Al, 0.5 to 3.5 wt % of Mg, the balance Zn, and unavoidable impurities.

* * * * *